United States Patent
Lee et al.

(10) Patent No.: US 8,458,520 B2
(45) Date of Patent: Jun. 4, 2013

(54) APPARATUS AND METHOD FOR VERIFYING TRAINING DATA USING MACHINE LEARNING

(75) Inventors: Changki Lee, Daejeon (KR); HyunKi Kim, Daejeon (KR); YiGyu Hwang, Daejeon (KR); Soojong Lim, Daejeon (KR); Hyo-Jung Oh, Daejeon (KR); Chung Hee Lee, Daejeon (KR); Jeong Heo, Daejeon (KR); Miran Choi, Daejeon (KR); Yeo Chan Yoon, Daejeon (KR); Myung Gil Jang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 430 days.

(21) Appl. No.: 12/624,161

(22) Filed: Nov. 23, 2009

(65) Prior Publication Data

US 2010/0138712 A1    Jun. 3, 2010

(30) Foreign Application Priority Data

Dec. 1, 2008  (KR) .................. 10-2008-0120789
Mar. 19, 2009  (KR) .................. 10-2009-0023605

(51) Int. Cl.
*G06F 11/00* (2006.01)
(52) U.S. Cl.
USPC ............................................. 714/26; 706/12
(58) Field of Classification Search
USPC ...................................... 714/26, 746; 706/12
See application file for complete search history.

(56) References Cited

U.S. PATENT DOCUMENTS

| | | | | |
|---|---|---|---|---|
| 7,831,913 B2 * | 11/2010 | MacLaurin | | 715/708 |
| 7,991,709 B2 * | 8/2011 | Dejean et al. | | 706/12 |
| 8,103,646 B2 * | 1/2012 | Brown | | 707/705 |
| 2004/0078730 A1 * | 4/2004 | Ma et al. | | 714/54 |
| 2007/0143284 A1 | 6/2007 | Lee et al. | | |

FOREIGN PATENT DOCUMENTS

| | | |
|---|---|---|
| KR | 10-2003-0083451 | 10/2003 |
| KR | 10-2007-0060862 | 6/2007 |

OTHER PUBLICATIONS

Sungha Choi et al., "Ensemble Learning of Region Based Classifiers", Journal of Computer and Information Technology, vol. 34, No. 1(c), pp. 267-270, Dec. 31, 2007.
"Active Learning for Spoken Language Understanding", Gokhan Tur et al., ICASSP 2003.

\* cited by examiner

*Primary Examiner* — Philip Guyton
(74) *Attorney, Agent, or Firm* — Blakely, Sokoloff, Taylor & Zafman

(57) ABSTRACT

An apparatus for verifying training data using machine learning includes: a training data separation unit for separating provided initial training data into N training data and N verification data, where N is a natural number; a machine learning unit for performing machine learning on the separated training data to generate a training model; an automatic tagging unit for automatically tagging an original text of the verification data using the generated training model to provide automatic tagging results; and an error determination unit for comparing the verification data to the automatic tagging results to determine error candidates of the training data.

14 Claims, 3 Drawing Sheets

APPARATUS AND METHOD FOR VERIFYING TRAINING DATA USING MACHINE LEARNING

CROSS-REFERENCE(S) TO RELATED APPLICATION(S)

The present invention claims priority of Korean Patent Applications No. 10-2008-0120789, filed on Dec. 1, 2008, and No. 10-2009-0023605, filed on Mar. 19, 2009, which are incorporated herein by reference.

FIELD OF THE INVENTION

The present invention relates to an apparatus and method for verifying training data using machine learning, and more particularly, to an apparatus and method for verifying training data using machine learning capable of providing error candidates of training data by separating provided initial training data into training data and verification data and performing machine learning and automatic tagging.

BACKGROUND OF THE INVENTION

In an existing technology of detecting errors of the training data, first, a feature is generated from initial training data and a training model is generated using machine learning. Training data candidates are generated by automatically attaching tags to a raw corpus using the training model. Then, a reliability of the training data candidates is calculated to select and provide training data candidates to a user. When the user corrects errors of the training data candidates through a graphic user interface and adds the corrected training data candidates to the training data, a new training model is generated from the newly generated training data. This new training model is used to estimate an answer using a voting together with the existing training model. By repeating the above-described process, the accuracy of automatic tagging is gradually increased and the training data are enhanced.

As mentioned above, the existing technology of detecting errors of training data provides a method of additionally establishing the training data using the initial training data, but cannot determine errors of the initial training data.

SUMMARY OF THE INVENTION

In view of the above, the present invention provides an apparatus and method for verifying training data using machine learning, which separate given initial training data into training data and verification data and then perform machine learning and automatic tagging to provide error candidates of the training data.

Further, the present invention provides an apparatus and method for verifying training data using machine learning, which generate finally verified training data by combining verified training data resulted from verification or correction of the error candidates based on verification inputs by a user with training data which are not determined as the error candidates.

In accordance with an aspect of the present invention, there is provided an apparatus for verifying training data using machine learning, including:

a training data separation unit for separating provided initial training data into N training data and N verification data, where N is a natural number;

a machine learning unit for performing machine learning on the separated training data to generate a training model;

an automatic tagging unit for automatically tagging an original text of the verification data using the generated training model to provide automatic tagging results; and an error determination unit for comparing the verification data to the automatic tagging results to determine error candidates of the training data.

In accordance with another aspect of the present invention, there is provided a method for verifying training data using machine learning, including:

separating provided initial training data into N training data and N verification data, where N is a natural number;

performing machine learning on the separated training data to generate a training model;

automatically tagging an original text of the verification data using the generated training model to provide automatic tagging results; and comparing the verification data to the automatic tagging results to determine error candidates of the training data.

BRIEF DESCRIPTION OF THE DRAWINGS

The above features of the present invention will become apparent from the following description of preferred embodiments given in conjunction with the accompanying drawings, in which.

DETAILED DESCRIPTION OF THE EMBODIMENTS

Hereinafter, embodiments of the present invention are described in detail with reference to the accompanying drawings. Further, in the following description, well-known constitutions or functions will not be described in detail if they would obscure the invention in unnecessary detail.

Figure 1:
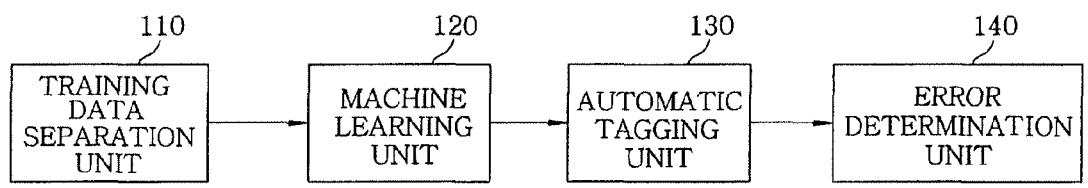
FIG. 1 shows a block diagram of an apparatus for verifying training data using machine learning in accordance with an embodiment of the present invention.

FIG. 1 shows a block diagram of an apparatus for verifying training data using machine learning in accordance with an embodiment of the present invention.

As illustrated in FIG. 1, the apparatus for verifying training data includes a training data separation unit 110, a machine learning unit 120, an automatic tagging unit 130, and an error determination unit 140.

The training data separation unit 110 separates given initial training data into N (N is a natural number) training data and N verification data, and provides them to the machine learning unit 120. More specifically, the training data separation unit 110 separates the initial training data into N separated data and generates N pairs of training data and verification data from the N separated data. For example, among the N separated data, total N−1 separated data, i.e., from the first to K−1st (K is a natural number less than N) separated data and from K+1st to N-th separated data are generated as the training data, and the remaining K-th separated data is generated as the verification data. In this way, N pairs of N−1 training data and K-th verification data are generated. The process of separating training data will be described below in more detail with reference to FIG. 3.

The machine learning unit 120 performs the machine learning on the training data separated by the training data separation unit 110, thereby generating a training model. The training model is provided to the automatic tagging unit 130.

The automatic tagging unit 130 automatically tags an original text of the verification data separated by the training data separation unit 110 using the training model generated by the machine learning unit 120. The automatic tagging results are provided to the error determination unit 140.

The error determination unit 140 compares the verification data separated by the training data separation unit 110 to the automatic tagging results provided by the automatic tagging unit 130, that is, compares initial tagging results of the verification data to the automatic tagging results by the automatic tagging unit 130 to determine error candidates of the training data. The error candidates are provided to a user through an input/output device such as a graphic user interface. Also, the error determination unit 140 generates and provides finally verified training data by combining verified training data resulted from verification or correction of the error candidates based on user's verification inputs provided from the input/output device with training data which are not determined as the error candidates.

Figure 2:
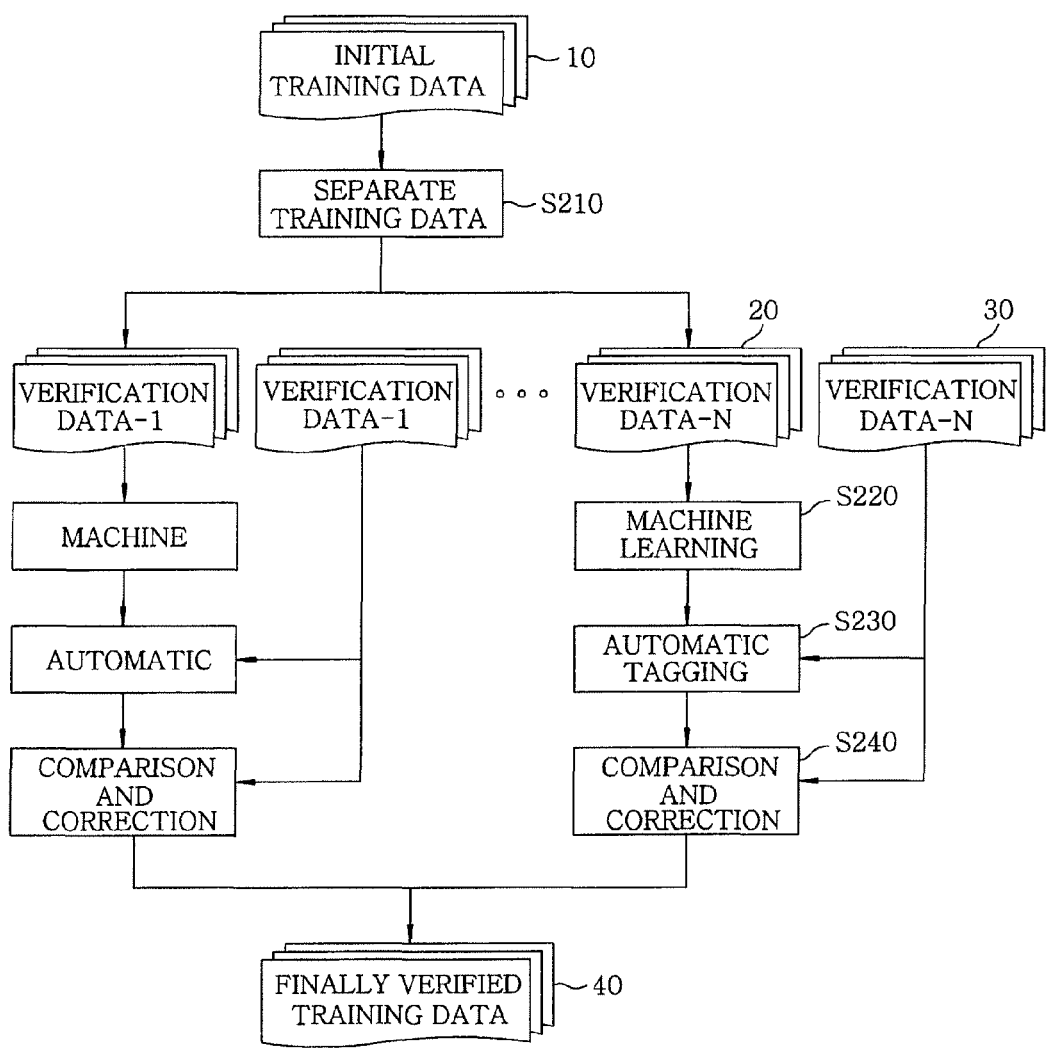
FIG. 2 illustrates a flowchart for explaining a method for verifying training data using machine learning in accordance with the embodiment of the present invention.

FIG. 2 illustrates a flowchart for explaining a method for verifying training data using machine learning in accordance with the embodiment of the present invention.

Referring to FIG. 2, when initial training data 10 is provided, the initial training data 10 is separated into N (N is a natural number), training data 20 and N verification data 30 in step S210. Thereafter, machine learning is performed on the separated training data to generate a training model in step S220. Then, using the training model, an original text of the verification data is automatically tagged to generate automatic tagging results in step S230. Next, in step S240, error candidates of the training data is determined by comparing the verification data to the automatic tagging results. The error candidates are provided to a user. Also, in the same step S240, finally verified training data is generated by combining verified training data resulted from verification or correction of the error candidates based on verification inputs by the user with training data which are not determined as the error candidates.

Figure 3:
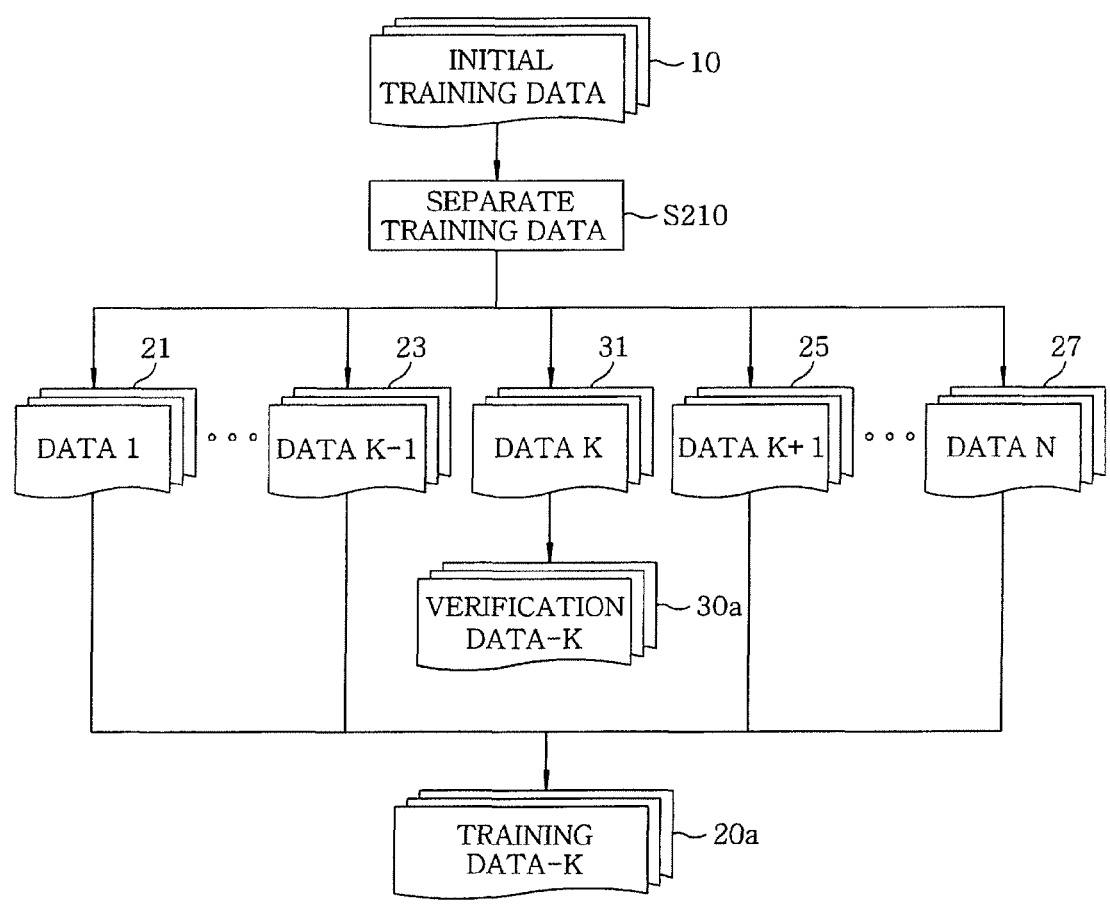
FIG. 3 is a conceptual diagram describing a process of separating training data in the method for verifying the training data using machine learning in accordance with the embodiment of the present invention.

FIG. 3 is a conceptual diagram describing a process of separating training data in the method for verifying the training data using machine learning in accordance with the embodiment of the present invention.

The process of verifying the initial training data will be described in detail with reference to FIGS. 1 to 3 as follows.

First, the training data separation unit 110 separates given initial training data 10 into N training data 20 and verification data 30 in step S210.

In more detail, referring to FIG. 3, the training data separation unit 110 separates the initial training data 10 into the N separated data 21, ..., 23, 31, 25, ..., 27 and generates N pairs of training data and verification data from the N separated data 21, ..., 23, 31, 25, ..., 27. For example, in a K-th pair of training data and verification data, among the N separated data 21, ..., 23, 31, 25, ..., 27, total N−1 separated data 21, ..., 23, 25, ..., 27, i.e., from the first separated data 21 to K−1st separated data 23 (where K is a natural number less than N) and from K+1st separated data 25 to N-th separated data 27, are generated as training data 20a. The remaining K-th separated data 31 is generated as verification data 30a. Therefore, total N pairs of training data and verification data are generated by combining N−1 training data 20a with K-th verification data 30a.

The machine learning unit 120 performs the machine learning on the training data 20 separated by the training data separation unit 110 to generate a training model in step S220. The training model is provided to the automatic tagging unit 130.

The automatic tagging unit 130 automatically tags an original text of the verification data 30 using the training model generated by the machine learning unit 120 and provides the automatic tagging results to the error determination unit 140 in step S230.

The error determination unit 140 compares the verification data 30 separated by the training data separation unit 110 to the automatic tagging results provided by the automatic tagging unit 130, that is, initial tagging results of the verification data 30 to the automatic tagging results by the automatic tagging unit 130 to determine error candidates of the training data 20 and provides a user with the error candidates through an input/output device such as a graphic user interface.

The comparison process for the error determination will be described with an example below.

The training data is composed of an original text and the automatic tagging results (example of named-entity recognition) as shown in the following example. The verification data is also composed of the same as those of the training data.

⌈Original text: It is distributed over Korea, Japan, Manchuria, Ussuri River and like places.

Named-entity recognition tagging: It is distributed over <Korea: Location>, <Japan: Location>, <Manchuria: Location>, <Ussuri River: Location>, and like places.⌋

The original text of the verification data is automatically tagged using the training model in the automatic tagging process. The automatic tagging results are compared to original tagging results of the verification data in the error determination process.

Lastly, if receiving user's verifications on the error candidates, which have been provided to the user, through the input/output device, the error determination unit 140 verifies or corrects the error candidates based on the received user's verification, thereby obtaining verified training data. Thereafter, the error determination unit 140 generates finally verified training data 40 by combining the verified training data with training data which are not determined as the error candidates.

The method for verifying training data using machine learning in accordance with the present invention may be implemented with a computer program. Codes and code segments constituting the computer program may be easily inferred by a programmer in the art. Further, the computer program can be stored in a computer-readable storage medium, and read and executed by a computer, thereby implementing the method for verifying training data using machine learning. The computer-readable storage medium includes a magnetic recording medium, an optical recording medium, and a carrier wave medium.

In accordance with the present invention, given initial training data are separated into training data and verification data, machine learning is performed to the separated training data to generate a training model, an original text of the verification data is automatically tagged using the generated training model, and the verification data is compared with the automatic tagging results to determine errors of the training data. Therefore, errors of the initial training data can be efficiently verified.

In addition, in accordance with the present invention, finally verified training data can be generated and provided by combining verified training data resulted from verifying or correcting error candidates based on user's verification inputs with training data which are not determined as the error candidates.

While the invention has been shown and described with respect to the embodiments, it will be understood by those skilled in the art that various changes and modification may be made without departing from the scope of the invention as defined in the following claims.

What is claimed is:

1. A non-transitory apparatus for verifying training data using machine learning, comprising:
    a training data separation unit for separating provided initial training data into N pieces of training data and N pieces of verification data, where N is a natural number;
    a machine learning unit for performing machine learning on the separated training data to generate a training model;
    an automatic tagging unit for automatically tagging an original text of the verification data using the generated training model to provide automatic tagging results; and
    an error determination unit for comparing initial tagging results of the verification data with the automatic tagging results to determine error candidates of the training data.

2. The apparatus of claim 1, wherein the error determination unit generates finally verified training data by combining verified training data resulted from verifying or correcting the error candidates based on verification inputs by a user with training data which are not determined as the error candidates.

3. The apparatus of claim 2, wherein the error determination unit determines the error candidates by comparing initial tagging results of the verification data with the automatic tagging results.

4. The apparatus of claim 2, wherein the training data separation unit separates the initial training data into N separated data and generates N pairs of training data and verification data from the N separated data.

5. The training data verification apparatus of claim 4, wherein the training data separation unit generates, among the N separated data, total N−1 separated data, i.e., from first separated data to K−1st separated data (where K is a natural number less than N) and from K+1st separated data to N-th separated data, as the training data and remaining K-th separated data as the verification data, and generates total N pairs of the training data and the verification data by combining N−1 training data and K-th verification data.

6. The apparatus of claim 1, wherein the training data separation unit separates the initial training data into N separated data and generates N pairs of training data and verification data from the N separated data.

7. The training data verification apparatus of claim 6, wherein the training data separation unit generates, among the N separated data, total N−1 separated data, i.e., from first separated data to K−1st separated data (where K is a natural number less than N) and from K+1st separated data to N-th separated data, as the training data and remaining K-th separated data as the verification data, and generates total N pairs of the training data and the verification data by combining N−1 training data and K-th verification data.

8. A method performed by an input/output device for verifying training data using machine learning, comprising:
    separating provided initial training data into N pieces of training data and N pieces of verification data, where N is a natural number;
    performing machine learning on the separated training data to generate a training model;
    automatically tagging an original text of the verification data using the generated training model to provide automatic tagging results; and
    comparing initial tagging results of the verification data with the automatic tagging results to determine error candidates of the training data to thereby provide the error candidates through the input/output device.

9. The method of claim 8, wherein said determining the error candidates includes generating finally verified training data by combining verified training data resulted from verifying or correcting the error candidates based on verification inputs provided through the input/output device by a user with training data which are not determined as the error candidates.

10. The method of claim 9, wherein the error candidates are determined by comparing initial tagging results of the verification data to the automatic tagging results.

11. The method of claim 9, wherein said separating the provided initial training data includes separating the initial training data into N separated data and generating N pairs of training data and verification data from the N separated data.

12. The method of claim 11, wherein said separating the provided initial training data includes:
    generating, among the N separated data, total N−1 separated data, i.e., from first separated data to K−1st separated data (where, K is a natural number less than N) and from K+1st separated data to N-th separated data, as the training data and remaining K-th separated data as the verification data, and
    generating total N pairs of the training data and the verification data by combining N−1 training data and K-th verification data.

13. The method of claim 8, wherein said separating the provided initial training data includes separating the initial training data into N separated data and generating N pairs of training data and verification data from the N separated data.

14. The method of claim 13, wherein said separating the provided initial training data includes:
    generating, among the N separated data, total N−1 separated data, i.e., from first separated data to K−1st separated data (where, K is a natural number less than N) and from K+1st separated data to N-th separated data, as the training data and remaining K-th separated data as the verification data; and
    generating total N pairs of the training data and the verification data by combining N−1 training data and K-th verification data.

* * * * *